United States Patent
Kwon et al.

(10) Patent No.: US 7,810,009 B2
(45) Date of Patent: Oct. 5, 2010

(54) APPARATUS AND METHOD FOR TRANSMITTING AND RECEIVING PACKET DATA USING HARQ IN A MOBILE COMMUNICATION SYSTEM

(75) Inventors: Hwan-Joon Kwon, Hwaseong-si (KR); Dong-Hee Kim, Yongin-si (KR); Jin-Kyu Han, Seoul (KR); Yu-Chul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1017 days.

(21) Appl. No.: 11/584,539

(22) Filed: Oct. 23, 2006

(65) Prior Publication Data

US 2007/0113138 A1    May 17, 2007

(30) Foreign Application Priority Data

Oct. 21, 2005   (KR) ...................... 10-2005-0099930

(51) Int. Cl.
    H04L 1/18    (2006.01)
(52) U.S. Cl. ...................................... 714/749; 714/774
(58) Field of Classification Search ................ 714/749, 714/774

See application file for complete search history.

(56) References Cited

U.S. PATENT DOCUMENTS

| | | | | |
|---|---|---|---|---|
| 5,844,918 | A * | 12/1998 | Kato ........................ | 714/776 |
| 6,693,910 | B2 * | 2/2004 | Chao ......................... | 714/751 |
| 6,901,063 | B2 * | 5/2005 | Vayanos et al. ............ | 370/335 |
| 7,505,397 | B2 * | 3/2009 | Lee et al. .................. | 370/208 |
| 7,631,247 | B2 * | 12/2009 | Petrovic et al. ........... | 714/776 |
| 2003/0097629 | A1 * | 5/2003 | Moon et al. ............... | 714/751 |
| 2003/0123389 | A1 * | 7/2003 | Russell et al. ............. | 370/230 |
| 2005/0053035 | A1 * | 3/2005 | Kwak et al. ............... | 370/331 |
| 2005/0243909 | A1 * | 11/2005 | Itahara et al. ............. | 375/240 |

* cited by examiner

*Primary Examiner*—M. Mujtaba K Chaudry
(74) *Attorney, Agent, or Firm*—Roylance, Abrams, Berdo and Goodman, LLP

(57) ABSTRACT

A system and method is provided for transmitting packet data in a base station of a wireless communication system using a Hybrid Automatic Repeat Request (HARQ) scheme. The method includes determining a HARQ scheme for use, from among a plurality of HARQ schemes including a Synchronous HARQ (SHARQ) scheme and an Asynchronous HARQ (AHARQ) scheme for transmission packet data, and transmitting the packet data along with control information including information indicating the determined HARQ scheme.

20 Claims, 5 Drawing Sheets

APPARATUS AND METHOD FOR TRANSMITTING AND RECEIVING PACKET DATA USING HARQ IN A MOBILE COMMUNICATION SYSTEM

CROSS-REFERENCE TO RELATED APPLICATIONS

This application claims the benefit under 35 U.S.C. §119 (a) of Korean Patent Application No. 10-2005-0099930, entitled "Apparatus and Method for Transmitting and Receiving Packet Data Using HARQ in a Mobile Communication System", filed Oct. 21, 2005 in the Korean Intellectual Property Office, the entire disclosure of which is hereby incorporated by reference.

BACKGROUND OF THE INVENTION

1. Field of the Invention

The present invention relates generally to an apparatus and method for transmitting and receiving packet data using Hybrid Automatic Repeat Request (HARQ). In particular, the present invention relates to an apparatus and method for transmitting and receiving packet data using HARQ in a mobile communication system.

2. Description of the Related Art

Presently, HARQ is one of the most important technologies used for increasing data transmission reliability and data throughput in packet-based mobile communication systems. Specifically, HARQ refers to a combined technology of Automatic Repeat Request (ARQ) and Forward Error Correction (FEC). Automatic Repeat Request (ARQ) is a technology that is widely used in wired/wireless data communication systems, and a brief description thereof will now be made herein below.

A transmitter of a system using ARQ assigns a sequence number to a transmission data packet according to a predetermined rule. A data receiver of the system using ARQ can detect a missing packet (or a reception-failed packet) among the received packets using the sequence number. Accordingly, a packet corresponding to a missing sequence number among the transmitted sequence numbers is the missing packet that the data receiver has failed to receive. In this case, the data receiver sends a request for retransmission of the reception-failed packet with the missing sequence number to the transmitter. In this way, the system using ARQ achieves reliable data transmission.

In the foregoing description, FEC refers to a technology for adding redundant bits to transmission data according to a predetermined rule before transmission, like convolutional coding or turbo coding, to overcome an error occurring in a noise or fading environment in a data transmission/reception process, thereby demodulating the originally transmitted data.

Therefore, the system using HARQ denotes a system using the combined technology of ARQ and FEC. A description will now be made of exemplary transmission/reception of packet data in a system using HARQ.

The data receiver of a system using HARQ performs decoding on a received packet through an inverse FEC process, and determines whether there is any error in the decoded data through a Cyclic Redundancy Check (CRC). If there is no error as a result of the CRC check, the data receiver responds with an Acknowledgement (ACK) to the transmitter over a response channel so that the transmitter can then transmit the next data packet. However, if there is an error in the received data as a result of the CRC check, the receiver responds with a Non-Acknowledgement (NACK) to the transmitter over the response channel so that the transmitter retransmits the previously transmitted packet.

In the foregoing process, if the received packet is a retransmitted packet, the receiver combines the received packet with the previously transmitted packet thereby obtaining an energy gain. As a result, the HARQ obtains highly improved performance, compared with the ARQ which does not support the combining process.

The HARQ technologies are classified according to a number of classification criterion, such as time interval between initial transmission and retransmission. A description will now be made of Synchronous HARQ (SHARQ) and Asynchronous HARQ (AHARQ) which are classified according to time interval between initial transmission and retransmission.

FIG. 1 is a diagram illustrating exemplary timing that occurs during SHARQ packet transmission/reception. With reference to FIG. 1, a description will now be made of exemplary SHARQ packet transmission/reception.

In FIG. 1, a horizontal axis indicates a time axis, of which an upper side of the horizontal axis shows a channel transmitted from a transmitter, and a lower side of the horizontal axis shows a channel transmitted from a receiver. In addition, an arrow denotes a transmission process from the transmitter to the receiver, or from the receiver to the transmitter.

An exemplary transmitter of a system using SHARQ transmits a control channel and a data channel at an initial transmission in step 101. The data channel is a channel used for transmitting the packet generated using transmission data, and the control channel is a channel used for transmitting the information necessary for demodulation and decoding of the packet transmitted through the data channel. The control information generally used in the system using HARQ is shown by way of example in Table 1 below.

TABLE 1

| Control information included in control channel | Number of allocated bits |
| --- | --- |
| MS ID Information | 10 |
| Data Information Size | 6 |
| MCS Information | 5 |
| Used Resource Information (or Resource Allocation Information) | 5 |
| ARQ ID | 3 |
| Sub-Packet ID | 3 |

A detailed description of the exemplary information shown in Table 1 will now be made below.

The MS ID denotes an identifier (ID) allocated for mobile station (MS) identification, predefined between a base station (BS) and an MS. The MS ID is included when the base station transmits data to the mobile station. However, the MS ID Information can be omitted from data control information, when the mobile station transmits data to the base station, and when the base station previously orders the mobile station to transmit data through a specific resource at a specific time.

The Data Information Size denotes the number of data bits transmitted in a given transmission interval. The Modulation and Coding Scheme (MCS) information denotes modulation and coding schemes used for data channel transmission. For example, the MCS Information indicates which of the various modulation schemes such as Quadrature Phase Shift Keying (QPSK), 8-ary Phase Shift Keying (8PSK), 16-ary Quadrature Amplitude Modulation (16 QAM), and 64-ary QAM (64QAM) is used, and which of the various coding schemes such as convolutional coding and turbo coding is used. The Used Resource Information denotes the amount of wireless resources used for data channel transmission. For example, in Code Division Multiple Access (CDMA), the Used Resource Information indicates the number of Walsh codes used for data channel transmission, and in Orthogonal Frequency Division Multiple Access (OFDMA), the Used Resource Information indicates the number of sub-carriers used for data transmission and their location information. The ARQ ID denotes an ID for each ARQ process when several ARQ processes are simultaneously supported, and the Sub-Packet ID denotes an ID used for identifying each retransmission among several retransmissions of one packet data.

FIG. 1 illustrates exemplary initial transmission steps 101 and 107, and first and second retransmission steps 103 and 105, respectively. It is shown in FIG. 1 that the control channel and the packet data channel are transmitted together only at the initial transmissions of steps 101 and 107. That is, it can be assumed for example that the control channel is not transmitted at retransmission. However, in some cases, the control channel can be transmitted together with the data channel even at retransmission.

Generally, in the system using HARQ, during data transmission, control information necessary for demodulation of the data channel is simultaneously transmitted over a control channel. However, the types of control information and the number of bits thereof, as shown in Table 1, are subject to change.

As shown in FIG. 1, if a transmitter (not shown) transmits a control channel and a data channel at initial transmission of step 101, a receiver (not shown) receives the control channel and the data channel. The receiver preferentially demodulates the control channel transmitted at the initial transmission of step 101. By demodulating the control channel, the receiver acquires control information necessary for demodulation of the data channel, and performs demodulation and decoding on a packet received through the data channel using the acquired control information. After the demodulation and decoding of the packet received through the data channel, the receiver determines whether the received data is successfully demodulated and decoded, by performing a CRC check on the decoded data.

In step 102, it is shown that demodulation and decoding at the receiver on the packet transmitted at the initial transmission of step 101 has failed. That is, the receiver transmits a NACK through a response channel in step 102. In response thereto, the transmitter performs a first retransmission in step 103. It can be assumed for example that the transmitter transmits only the data channel during retransmission. The receiver then demodulates and decodes the packet transmitted through the data channel, and transmits an ACK or a NACK according to a CRC result thereon in step 104.

For exemplary purposes, it is also shown in FIG. 1 that demodulation and decoding at the receiver on the first retransmitted data fails. Therefore, the receiver again generates a NACK and transmits the NACK to the transmitter in step 104. The transmitter then performs a second retransmission in step 105. As above, the transmitter transmits only the data channel, because the corresponding transmission is a retransmission. Through this process, if the receiver succeeds in demodulation and decoding on the packet received through the data channel, it transmits an ACK through a response channel in step 106. The transmitter can then perform initial transmission in step 107 after it receives the ACK in step 106.

The transmitter transmits a control channel and a data channel together at the initial transmissions in steps 101 and 107. The transmitter can perform the initial transmission of step 107 immediately upon receipt of the ACK in step 106, or perform the initial transmission after a lapse of a certain period of time. The next initial transmission time is determined depending on the scheduling result. In HARQ, because the number of retransmissions is determined according to the system, transmissions are limited to the number of retransmissions.

The information transmitted through the data channel in steps 101, 103 and 105 is the same information. However, it should be noted herein that even though the same information is transmitted through the data channel, different redundancies can be used. Each packet comprised of the same information represented by data transmissions 101, 103 and 105 for transmitting the same information is called a sub-packet.

In SHARQ, it should be noted that a time interval between steps 101, 103 and 105 is constant. That is, a time interval between initial transmission and retransmission or a time interval between retransmissions remains constant. In other words, in the SHARQ, only the initial transmission time is determined by a scheduler, and a retransmission packet for the initially transmitted packet is automatically transmitted after a lapse of a predetermined period of time from the initial transmission time. The expression "synchronous" in the term SHARQ indicates that the time interval is constant.

Therefore, the term "SHARQ" cannot be restrictively considered as a scheme that transmits control information only at the initial transmission and transmits no control information at retransmission as described in FIG. 1. However, unless stated otherwise, the term SHARQ used herein is considered to denote a scheme that transmits control information only at the initial transmission and transmits no control information at retransmission as described in FIG. 1, but is not limited thereto.

The SHARQ scheme transmits no control information during retransmission because for the retransmission sub-packets, their control information is the same information as that used at the initial transmission or is information that can be estimated. Therefore, in the case of the first retransmission, i.e. in the case of step 103, for the retransmitted sub-packet, the receiver can combine it with the sub-packet transmitted through the data channel at the initial transmission in step 101 according to a predetermined rule. The receiver attempts demodulation of the data channel using the combined result. Thereafter, the receiver demodulates and decodes the combined packet, and determines whether the data transmission is successful using the CRC result on the demodulated and decoded packet. That is, the receiver determines whether it has succeeded in decoding the combined sub-packet using the CRC result. The same is applied even to the sub-packet retransmitted afterward. That is, the receiver combines the sub-packet retransmitted in step 105 with the previously transmitted sub-packets, performs demodulation and decoding on the combined sub-packet, and determines whether the data transmission is successful using the CRC result.

FIG. 2 is a diagram illustrating exemplary timing during AHARQ packet transmission/reception. With reference to FIG. 2, a description will now be made of AHARQ packet transmission/reception.

In FIG. 2, a horizontal axis indicates a time axis, of which an upper side of the horizontal axis shows a channel transmitted from a transmitter, and a lower side of the horizontal axis shows a channel transmitted from a receiver. In addition, an arrow denotes a transmission process from the transmitter to the receiver, or from the receiver to the transmitter.

A transmitter (not shown) performs an initial transmission in step 201. Here, it can be assumed for example that the initial transmission is comprised of a data channel and a control channel. A receiver (not shown) receives the data channel transmitted in step 201, and demodulates the control channel and acquires control information necessary for demodulation of the data channel. In addition, the receiver attempts demodulation and decoding on the data channel using the control information. In this process, the receiver determines whether it has succeeded in demodulating and decoding the packet using the CRC result on the demodulated and decoded packet. If it is determined from the CRC result that the packet transmitted through the data channel is not successfully demodulated and decoded, the receiver transmits a NACK to the transmitter through a response channel.

For exemplary purposes, it is shown in FIG. 2 that the demodulation and decoding at the receiver has failed. Therefore, the receiver transmits a NACK to the transmitter through the response channel in step 202. Upon receipt of the NACK, the transmitter performs retransmission on the initially transmitted packet in step 203. It should be noted in AHARQ that a time interval between the initial transmission in step 201 and the retransmission in step 203 is not constant as shown in FIG. 2. That is, the transmitter can transmit a different retransmission packet each occasion. In other words, compared with the HARQ scheme shown in FIG. 1 where only the initial transmission time is scheduled and the retransmission time is automatically determined from the initial transmission time, the AHARQ scheme shown in FIG. 2 determines not only the initial transmission time, but also all retransmission times using a scheduler.

Therefore, once a first retransmission time is determined by the scheduler, the transmitter transmits the control channel and the data channel together. in step 203. The receiver can then perform demodulation and decoding on the packet transmitted through the data channel using the received control channel, and detect the demodulation and decoding result using a CRC.

For exemplary purposes, it is shown in FIG. 2 that demodulation and decoding on the first retransmitted packet at the receiver has failed. Therefore, the receiver transmits a NACK through a response channel in step 204. The transmitter then determines a second retransmission time using the scheduler, and performs a second retransmission in step 205. It is shown in FIG. 2 that a time interval between the first retransmission and the second retransmission is constant as shown in FIG. 1. That is, in terms of the retransmission time, the AHARQ scheme can be equal to the SHARQ scheme.

The receiver receives the sub-packet transmitted in step 205, and demodulates and decodes the received sub-packet. The receiver determines in step 206 whether it has succeeded in the demodulation and decoding through a CRC of the demodulated and decoded packet. It can be assumed for example in step 206 of FIG. 2 that the CRC result indicates success in the demodulation and decoding. Therefore, the receiver transmits an ACK through a response channel in step 206. The retransmitted sub-packets, as described in FIG. 1, are combined by the receiver and then demodulated and decoded.

It can be noted from FIG. 2 that the transmitter performs retransmission in step 203 regardless of the initial transmission time of step 201. It would be obvious to those skilled in the art that the transmission time of step 203 can be determined to be equal to the time shown in step 103 of FIG. 1. It is also well known that the retransmission is performed after a NACK is received from the receiver.

Since the retransmission time is also scheduled as described above, the AHARQ scheme is characterized in that the control channel should be transmitted together during every sub-packet transmission. This means that the control channel including ID information for the transmitted packet is always transmitted together, because as the retransmission time is not determined, the receiver cannot be aware of the time that the retransmission packet is transmitted.

This also means that the AHARQ scheme is disadvantageously greater than the SHARQ in terms of overhead. However, the AHARQ scheme is advantageously greater than the SHARQ scheme in terms of scheduling freedom. The greater scheduling freedom indicates that the scheduler freely determines a retransmission time so as to first transmit high-priority packets and transmit the retransmission packet later.

A description will now be made of exemplary advantages and disadvantages of the SHARQ scheme and the AHARQ scheme of FIGS. 1 and 2.

The SHARQ scheme has an advantage of low overhead because it transmits the control channel only at the initial transmission. However, the AHARQ scheme has an advantage of high scheduling freedom because the scheduler can determine the retransmission time.

In addition to the above schemes, there are various service types available in the data transmission system. For example, there is real-time service that is susceptible to data transmission time delay, and a best-effort service that is unsusceptible to transmission time delay. In addition, the real-time service is generally characterized in that small packets are frequently generated. Therefore, the SHARQ scheme is advantageous to the real-time service where the small packets are generated frequently, and the AHARQ scheme is advantageous to the service less susceptible to time delay. However, the common mobile communication system uses only one of the SHARQ scheme and the AHARQ scheme. Therefore, the SHARQ and AHARQ schemes, when only one of them is used, are inefficient in an environment where several types of services are provided to several users in a mobile communication system. In addition, because the types of data services provided to users are being subdivided, it is not possible to actively cope with data transmission with only one HARQ scheme.

Accordingly, a need exists for an improved system and method for using HARQ in a mobile communication system where several types of services are provided to several users.

SUMMARY OF THE INVENTION

It is, therefore, an object of embodiments of the present invention to substantially solve the above and other problems and provide an apparatus and method for efficiently transmitting and receiving a packet using HARQ in a mobile communication system where several types of services are provided to several users.

It is another object of embodiments of the present invention to provide an apparatus and method for transmitting and receiving a packet using HARQ according to type of service provided to a user.

According to one aspect of embodiments of the present invention, a method is provided for transmitting packet data in a base station of a wireless communication system using a Hybrid Automatic Repeat Request (HARQ) scheme. The method comprises determining a HARQ scheme for use from among a plurality of HARQ schemes, including a Synchronous HARQ (SHARQ) scheme and an Asynchronous HARQ (AHARQ) scheme for transmission packet data, and transmitting the packet data along with control information including information indicating the determined HARQ scheme.

According to another aspect of embodiments of the present invention, an apparatus is provided for transmitting packet data in a base station of a wireless communication system using a Hybrid Automatic Repeat Request (HARQ) scheme. The apparatus comprises a scheduler for determining a HARQ scheme for use from among a plurality of HARQ schemes including a Synchronous HARQ (SHARQ) scheme and an Asynchronous HARQ (AHARQ) scheme for transmission packet data, and a controller for transmitting the packet data along with control information including information indicating the HARQ scheme determined by the scheduler.

According to another aspect of embodiments of the present invention, a method is provided for receiving packet data using a Hybrid Automatic Repeat Request (HARQ) scheme in a receiver of a wireless communication system that transmits packet data using one of a Synchronous HARQ (SHARQ) scheme and an Asynchronous HARQ (AHARQ) scheme. The method comprises receiving a control channel and a data channel and determining a HARQ scheme for use from among a plurality of HARQ schemes including the SHARQ scheme and the AHARQ scheme using information included in the control channel, performing demodulation and decoding on the data channel according to the determined HARQ scheme and transmitting the demodulation and decoding result through a response channel, and when a retransmission packet is received through the data channel, receiving the retransmission data according to the determined HARQ scheme and transmitting the reception result through a response channel.

According to yet another aspect of embodiments of the present invention, an apparatus is provided for receiving packet data using a Hybrid Automatic Repeat Request (HARQ) scheme in a receiver of a wireless communication system that transmits packet data using one of a Synchronous HARQ (SHARQ) scheme and an Asynchronous HARQ (AHARQ) scheme. The apparatus comprises a control channel receiver for receiving and demodulating a control channel, a data channel receiver for receiving a data channel and demodulating and decoding the received data channel, a response channel transmitter for transmitting the demodulation and decoding result on the data channel, a memory for receiving and storing control information, and a controller for determining a HARQ scheme for use from among a plurality of HARQ schemes including the SHARQ scheme and the AHARQ scheme using information included in the control channel, controlling reception, demodulation and decoding of the data channel receiver according to the determined HARQ scheme, controlling transmission of the demodulation and decoding result to the response channel transmitter and when a retransmission packet is received with the SHARQ scheme, controlling demodulation and decoding of the received packet using information stored in the memory and when a retransmission packet is received with the AHARQ scheme, controlling demodulation and decoding of a packet received at the data channel receiver using control information received at the control channel receiver.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The HARQ scheme proposed in embodiments of the present invention is designed to support both a SHARQ scheme and a AHARQ scheme in one system. In the proposed HARQ scheme, during data transmission, a transmitter first determines whether it will transmit data with the SHARQ scheme or the AHARQ scheme preferably according to a predetermined rule. Thereafter, the transmitter includes an ID for the determined HARQ scheme in control information and transmits the control information. A data receiver then detects an ID for the HARQ scheme from the control information to determine with which HARQ scheme the data was transmitted, and adaptively receives the data according thereto.

In determining the HARQ scheme, if the data transmission is a forward transmission from a base station to a mobile station, a base station scheduler can determine a HARQ scheme to be used for this transmission at every transmission time. However, if the data transmission is a reverse transmission from a mobile station to a base station, the mobile station transmits data with a HARQ scheme predetermined by the base station. The HARQ scheme is preferably determined depending on service type, size of transmission packet data, class of the mobile station, load of the current network, and so forth.

Figure 1:
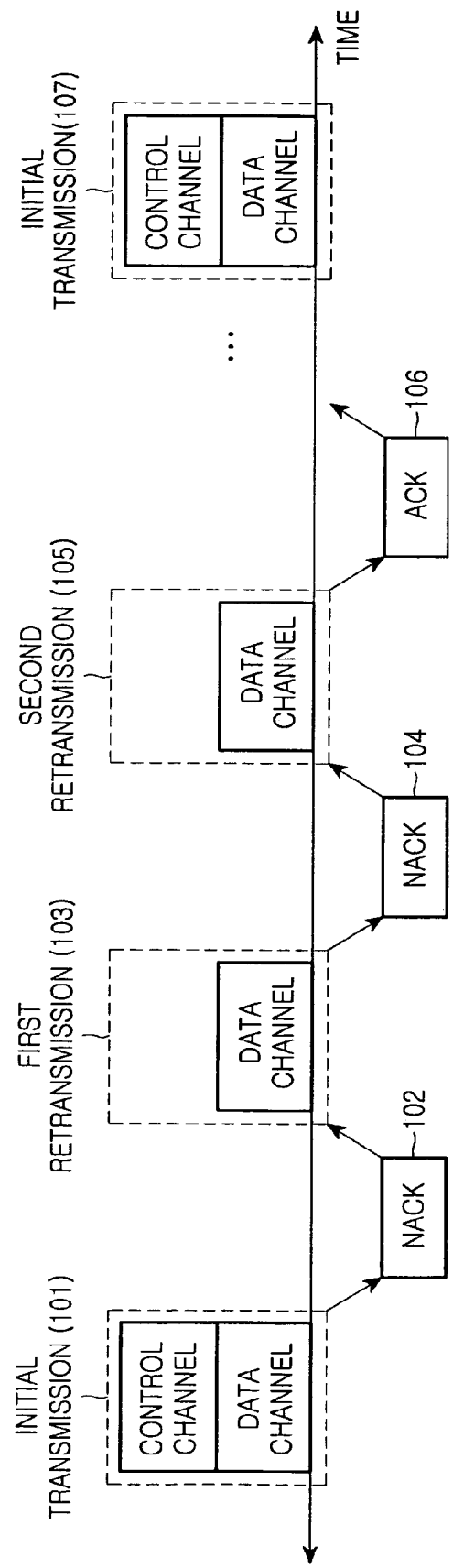
FIG. 1 is a diagram illustrating exemplary timing during SHARQ packet transmission/reception.
Figure 2:
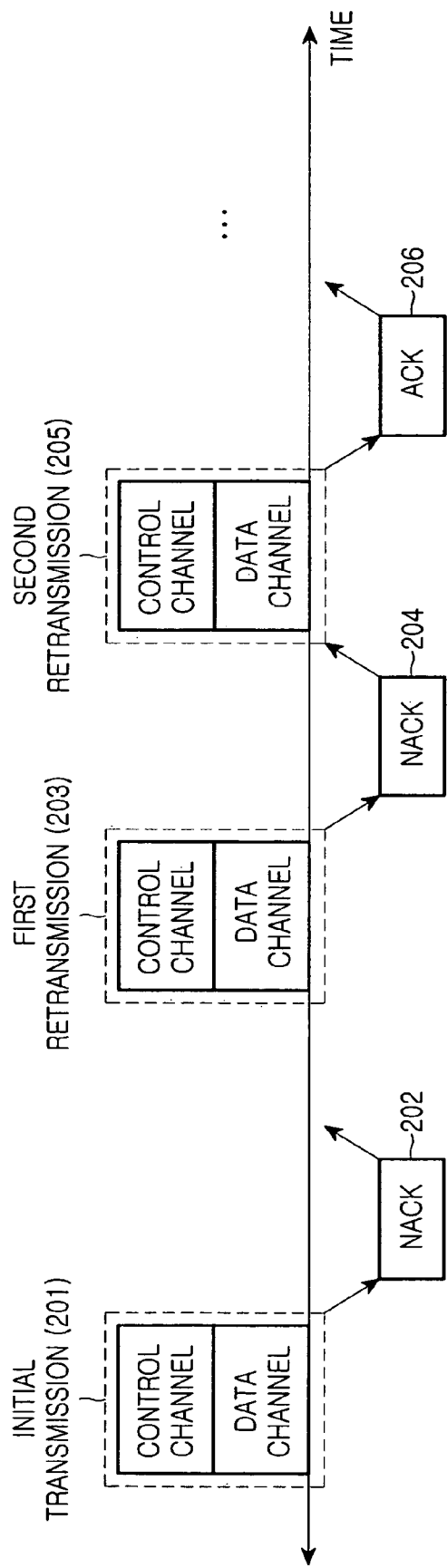
FIG. 2 is a diagram illustrating exemplary timing during AHARQ packet transmission/reception.

In the following description, the term "SHARQ" denotes a scheme that has fixed initial transmission time and retransmission time, and transmits a control channel including control information only at the initial transmission as described in FIG. 1. However, in yet other embodiments of the present invention the included SHARQ scheme can be the modified SHARQ scheme pursued by a particular system. The modified SHARQ scheme includes a scheme for transmitting control information even at the retransmission time. For example, the modified SHARQ scheme has the fixed initial transmission time and retransmission time, but it transmits a small amount of control information even at the retransmission time unlike the common SHARQ scheme shown in FIG. 1. In the modified SHARQ scheme, because the initial transmission time and the retransmission time are fixed, the MS ID, Data Control Information, ARQ ID, and Sub-Packet ID in the control information as shown in Table 1, are not transmitted during retransmission. However, if a change in an MCS level is permitted during retransmission of the modified SHARQ scheme, the MCS information can be transmitted even at the retransmission. In addition, if it is allowable to differentiate the amount and positions of resources used for a data channel during modified SHARQ retransmission from those at the initial transmission, the used control information can be used even at the retransmission. It should be noted that such modifications can also be modified in embodiments of the present invention.

Although embodiments of the present invention will be described with reference to the common SHARQ scheme described in FIG. 1, it can also be applied to the modified SHARQ scheme. That is, embodiments of the present invention will be described with reference to the SHARQ scheme that transmits no control information during retransmission. However, it should be noted that embodiments of the present invention can be applied even to the modified SHARQ scheme that transmits a small amount of control information during retransmission.

Figure 3:
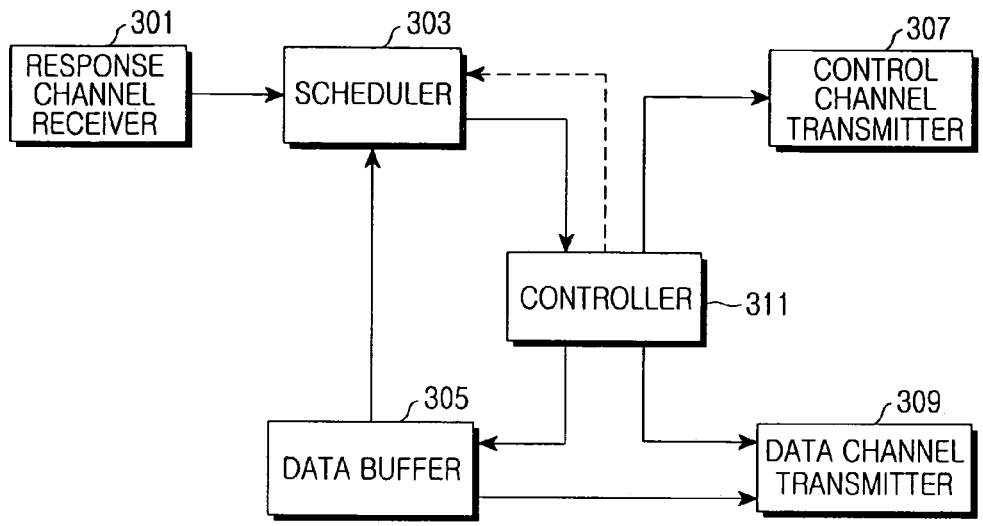
FIG. 3 is a block diagram illustrating a structure of a transmitter according to an exemplary embodiment of the present invention.

FIG. 3 is a block diagram illustrating a structure of a transmitter according to an exemplary embodiment of the present invention. With reference to FIG. 3, a description will now be made of a structure and operation of a transmitter according to an exemplary embodiment of the present invention.

A response channel receiver 301 receives a response signal transmitted by a receiver, and outputs the received response signal to a scheduler 303. That is, the response channel receiver 301 receives a signal indicating ACK or NACK for the packet transmitted from the receiver through a data channel, and provides the received signal to the scheduler 303.

A data buffer 305 comprises a memory for storing data to be transmitted to a specific receiver. The data buffer 305 provides information on the data to be transmitted to the receiver, to the scheduler 303. That is, the data buffer 305 provides information indicating whether there is stored data to be transmitted to the receiver and, if any, the amount of the stored data. The data buffer 305 comprises a retransmission buffer (not separately shown in FIG. 3) for storing retransmission data. That is, the data buffer 305 includes the retransmission buffer for storing the data until it receives an ACK for the transmitted data or the current transmission reaches the maximum number of retransmissions, or until upper layer processing is completed. In addition, the data buffer 305 can provide information on a characteristic of the transmission data or a type of the service according to embodiments of the present invention, and can also provide information on the class type of the receiver. Alternatively, the information on the characteristic of the transmission data or the type of the service, and the information on the class type of the receiver can be provided by a controller 311.

The scheduler 303 receives the ACK/NACK information provided from the response channel receiver 301, and the information on the characteristic of the transmission data or the type of the service and the information on the class type of the receiver, provided from the data buffer 305 or the controller 311. Further, the scheduler 303 receives system load information from the controller 311. Based on the received information, the scheduler 303 determines the data to be transmitted next, and also determines a transmission scheme. That is, the scheduler 303 determines the information on the HARQ scheme, MCS level of transmission data, transmission time, data rate, and allocated resources, and provides the information to the controller 311.

The controller 311 can provide the scheduler 303 with the information on the characteristic of the transmission data or the type of the service and the information on the class type of the receiver when necessary. The controller 311 also controls the reset of the retransmission buffer in the data buffer 305. Further, the controller controls a data channel transmitter 309 and a control channel transmitter 307. The controller 311 generates control information to be transmitted to the control channel transmitter 307 using the information received from the scheduler 303. The information that the controller 311 generates using the information received from the scheduler 303 is shown by way of example in Table 2 below.

TABLE 2

| Control information included in control channel | Number of allocated bits |
|---|---|
| MS ID information | 10 |
| HARQ Scheme (SHARQ or AHARQ) | 1 |
| Data Information Size | 6 |
| MCS Information | 5 |
| Used Resource Information (or Resource Allocation Information) | 5 |
| ARQ ID | 3 |
| Sub-Packet ID | 3 |

Referring to Table 2, it can be noted that a 1-bit ID for a HARQ scheme is added in addition to the fields described above in Table 1. This bit indicates whether the SHARQ scheme is used or the AHARQ scheme is used, when retransmission is performed on the packet initially transmitted in the corresponding transmission interval. The other fields are substantially the same as those in Table 1, so further description thereof will be omitted.

The controller 311 generates the new control information shown in Table 2, including the HARQ scheme information, and provides the generated control information to the control channel transmitter 307. That is, compared with Table 1, Table 2 further includes the field indicating whether the transmission packet is transmitted with the SHARQ scheme or the AHARQ scheme, to thereby indicate with which HARQ scheme the packet is to be transmitted at the next transmission.

The controller 311 controls the data channel transmitter 309 depending on the control information, such that the data channel transmitter 309 performs coding and modulation according to a predetermined MCS level and transmits the packet using the allocated resource at the time determined by the scheduler 303. A detailed description thereof will now be made with reference to the control flow given below.

The control channel transmitter 307, under the control of the controller 311, transmits the control information shown in Table 2 through a control channel. The data channel transmitter 309, under the control of the controller 311, generates a packet by coding and modulating transmission data according to the predetermined MCS level, and transmits the packet through the data channel using the allocated resources. Herein, the transmitted packet can be a sub-packet as described above. In the following description, the packet and the sub-packet have the same meaning unless stated otherwise.

Figure 4:
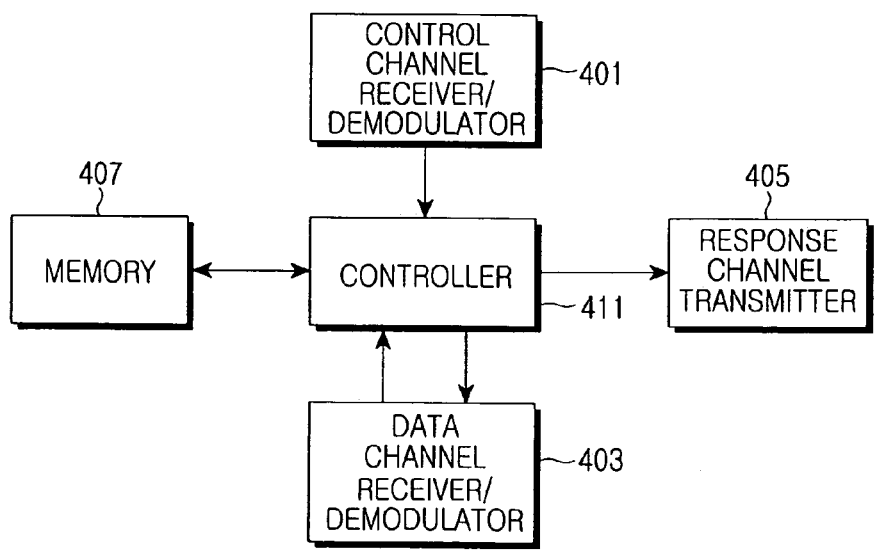
FIG. 4 is a block diagram illustrating a structure of a receiver according to an exemplary embodiment of the present invention.

FIG. 4 is a block diagram illustrating a structure of a receiver according to an exemplary embodiment of the present invention. With reference to FIG. 4, a description will now be made of a structure and operation of a receiver according to an exemplary embodiment of the present invention.

A control channel receiver/demodulator 401, under the control of a controller 411, receives a control channel transmitted from a transmitter, demodulates the received control channel, and provides the demodulated information to the controller 411. A data channel receiver/demodulator 403, under the control of the controller 411, receives a control channel transmitted from the transmitter, performs demodulation and decoding on a data channel transmitted from the transmitter using the control information provided from the controller 411, and provides a CRC result thereon to the controller 411.

The controller 411 stores the control information received from the control channel receiver/demodulator 401 in a memory 407, reads the control information stored in the memory 407 when necessary, and provides the read control information to the data channel receiver/demodulator 403. That is, when data is transmitted according to the SHARQ scheme, the controller 411 reads the control information from the memory 407, and provides the read control information to the data channel receiver/demodulator 403, so as to demodulate and decode the data. Further, the controller 411 generates a response signal to be transmitted to the transmitter according to the CRC result received from the data channel receiver/demodulator 403, and provides the response signal to a response channel transmitter 405.

The response channel transmitter 405, under the control of the controller 411, transmits the received response signal to the transmitter through a response channel. Herein, the response signal can be ACK/NACK information for the demodulation/decoding result on the received packet.

Figure 5:
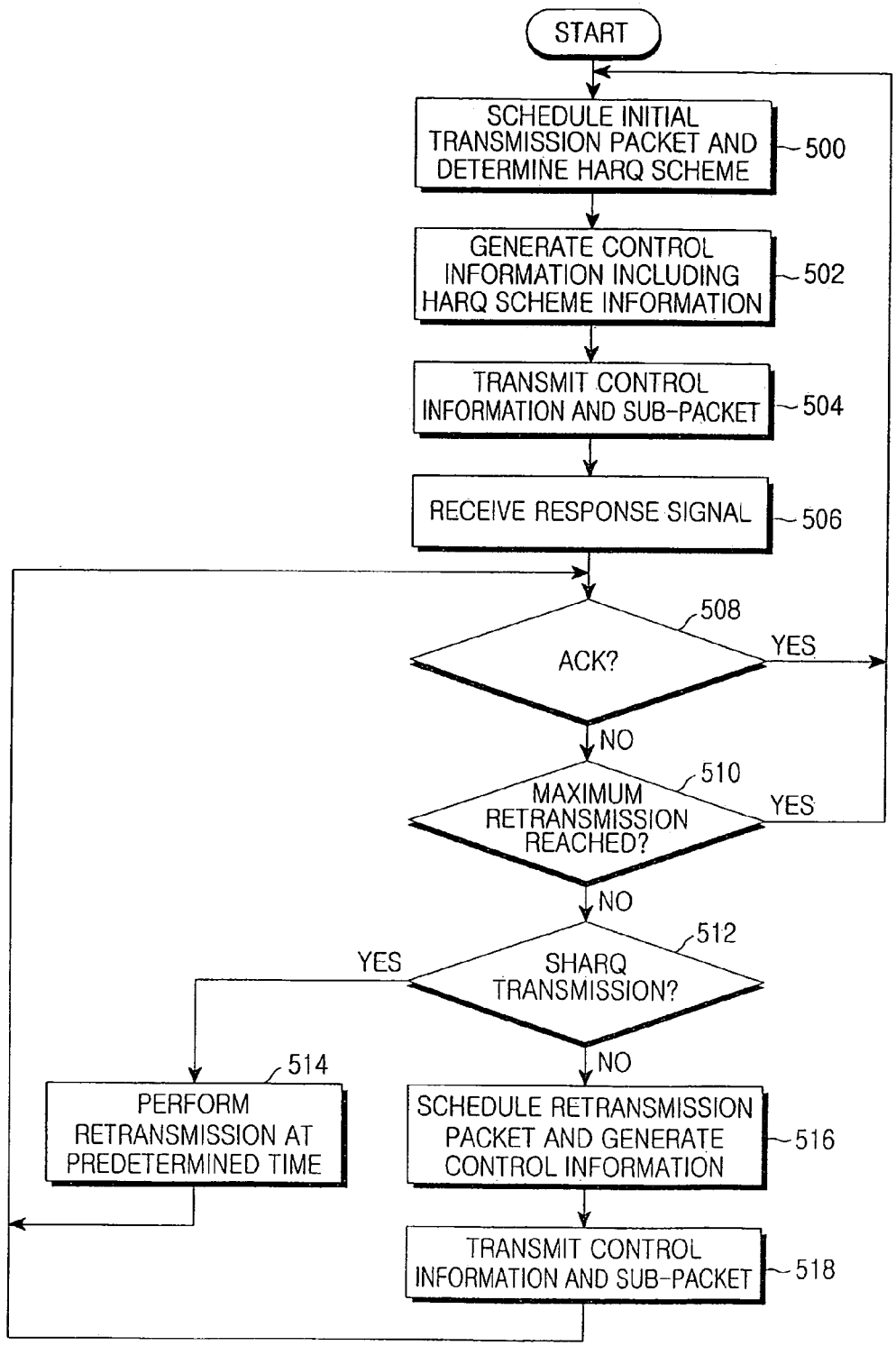
FIG. 5 is a flowchart illustrating a packet transmission operation in a transmitter according to an exemplary embodiment of the present invention.

FIG. 5 is a flowchart illustrating a packet transmission operation in a transmitter according to an exemplary embodiment of the present invention. With reference to FIG. 5, a detailed description will now be made of a packet transmission operation in a transmitter according to an exemplary embodiment of the present invention.

In step 500, a scheduler 303 of the transmitter performs scheduling on an initial transmission packet and determines an HARQ scheme. Herein, the expression "perform scheduling" refers to determining to which user the base station will transmit the data in a forward data transmission process. The scheduling further includes for example, determining data rate, transmission scheme, modulation scheme, and the amount of resources to be used, for the determined user. The "amount of resources to be used" refers to the amount of resources to be allocated to the receiver in the system. For example, in the CDMA system, the amount of resources to be used is the amount of codes to be used, and in the OFDMA system, the amount of resources to be used is the amount of sub-carriers to be used.

In the case of reverse transmission, the expression "perform scheduling" refers to indicating for which user the base station will permit data transmission. In this case as above, the scheduling includes for example, determining data rate, transmission scheme, modulation scheme, and the amount of resources to be used. That is, the expression "perform scheduling" is considered to indicate the operation in which the base station makes a decision on the control information shown in Table 2, except for the HARQ scheme information.

In step 500, the scheduler 303 additionally determines a HARQ scheme to be used, in addition to the determined control information. Herein, the expression "determine a HARQ scheme" refers to determining which of the SHARQ scheme and the AHARQ scheme the transmitter will use.

As described in FIG. 3, in embodiments of the present invention, the scheduler 303 can determine the HARQ scheme based on service type of the data transmitted this time, size of the packet transmitted this time, class of the mobile station, load of the current network, and so forth.

An exemplary reason for proposing the HARQ scheme for each individual service type is as follows. The use of the SHARQ scheme is advantageous to real-time traffic service that is susceptible to time delay, where small packets are generated frequently, like VoIP and Gaming services. However, the use of the AHARQ scheme is advantageous to service that is less susceptible to time delay, where larger packets are generated on a burst basis, like Download and Web Surfing services.

That is, the SHARQ scheme having lower overhead for control information transmission is efficient for real-time traffic service where small packets are generated frequently, because small packets should be transmitted frequently in real-time traffic service. However, the AHARQ scheme having higher overhead for control information transmission but having greater scheduling freedom is advantageous to service that is less susceptible to time delay, where larger packets are generated on a burst basis, because a larger packet is transmitted at one transmission using the large amount of resources in this service.

An exemplary reason for proposing the HARQ scheme depending on a size of the packet data transmitted in this transmission interval is as follows. If the size of the packet data to be transmitted in this transmission interval is small, the packet data is preferably transmitted with the SHARQ scheme. However, if the size of the packet data to be transmitted in this transmission interval is large, the packet data is preferably transmitted with the AHARQ scheme. This is because the AHARQ scheme has a disadvantage of high overhead due to the control information transmission. However, if the size of the packet data to be transmitted in this transmission interval is large, the overhead of the control information is lower. Therefore, the disadvantage of the SHARQ scheme is less, so the packet is transmitted with the AHARQ scheme having an advantage of greater scheduling freedom. However, if the size of the packet data to be transmitted in this transmission interval is small, the packet data is transmitted with the SHARQ scheme having low overhead for the data control information.

An exemplary reason for proposing the HARQ scheme depending on the class of the mobile station is as follows. As described above, the SHARQ scheme has fixed initial transmission time and retransmission time, indicating that the SHARQ scheme performs retransmission immediately when the retransmission is necessary. Therefore, for a high-class mobile station, the SHARQ scheme having a short packet delay time is selected, and for a low-class mobile station, the AHARQ scheme having a long packet delay time is selected.

Finally, an exemplary reason for proposing the HARQ scheme depending on the network load is as follows. For a low-load network, because scheduling freedom is less important, the SHARQ scheme is selected, thereby securing fast retransmission. However, for a high-load network where there are many users, the AHARQ scheme having high scheduling freedom is preferable. Therefore, the HARQ scheme can be determined using one or more of the foregoing methods.

In step 502, after completion of the scheduling and the decision on the HARQ scheme, the controller 311 generates control information including HARQ scheme information. The control information including the HARQ scheme information can be generated as shown in Table 2. After generating the control information, the controller 311 proceeds to step 504 where it controls the control channel transmitter 307 and the data channel transmitter 309 so as to demodulate and transmit the generated control information, and to generate and transmit a packet using the data stored in the data buffer 305.

Thereafter, in step 506, the transmitter receives a response signal transmitted from the receiver through the response channel receiver 301. This signal is the information indicating whether the receiver has normally received the transmitted packet. The process of transmitting the response signal will be described in greater detail with reference to FIG. 6.

Upon receipt of the response signal from the response channel receiver 301, the scheduler 303 determines in step 508 whether the received response signal indicates an ACK. If it is determined that the response signal indicates an ACK, the scheduler 303 returns to step 500 and repeats the foregoing processes.

However, if it is determined in step 508 that the response signal received through the response channel is a NACK, the scheduler 303 determines in step 510 whether the current transmission on the packet has reached a maximum number of retransmissions. Herein, the maximum number of retransmissions denotes a number of retransmissions, predefined in the system. That is, the maximum number of retransmissions indicates the number of retransmissions, defined such that even though the packet was transmitted a specified number of times taking the system load into account, if the receiver fails to normally receive the corresponding packet, the transmitter no longer performs retransmission. Such a process can be omitted according to system design.

If it is determined in step 510 that the current transmission has reached the maximum number of retransmissions, the controller 311 returns to the initial transmission of step 500, because it is defined in the system that the transmitter no longer performs retransmission. However, if the current transmission has not reached the maximum number of retransmissions, the controller 311 determines in step 512 whether the initially transmitted packet was transmitted with the SHARQ scheme. Such information can be previously stored in a separate memory or a control memory (not shown in FIG. 3), and then read when necessary.

If it is determined that the initial transmission was performed with the SHARQ scheme, the controller 311 proceeds to step 514 where it performs retransmission at a predetermined time. That is, because the SHARQ scheme has a constant time interval between the initial transmission and retransmission, and a constant time interval between first retransmission and second retransmission, if a predetermined time elapses from the previous transmission, the controller 311 automatically performs retransmission. In this case, the controller 311 does not transmit the control channel. This is because the SHARQ scheme does not transmit a control channel during retransmission as described above. However, in the modified SHARQ scheme, the controller 311 can transmit a limited amount of control information.

However, if it is determined in step 512 that the initially transmitted packet was transmitted with the AHARQ scheme, the scheduler 303 performs scheduling on the retransmission packet and generates control information in step 516. In this scheduling process, the scheduler 303 newly determines an arbitrary retransmission time. After the retransmission time is determined, the controller 311 proceeds to step 518 where it generates control information based on the scheduling result and a packet based on the packet data, and transmits the control information and the packet by controlling the control channel transmitter 307 and the data channel transmitter 309.

In determining the HARQ scheme, it is also possible to take into account other factors as well, in addition to the service type, size of the packet data, class of the mobile station, load of the network, and so forth.

Figure 6:
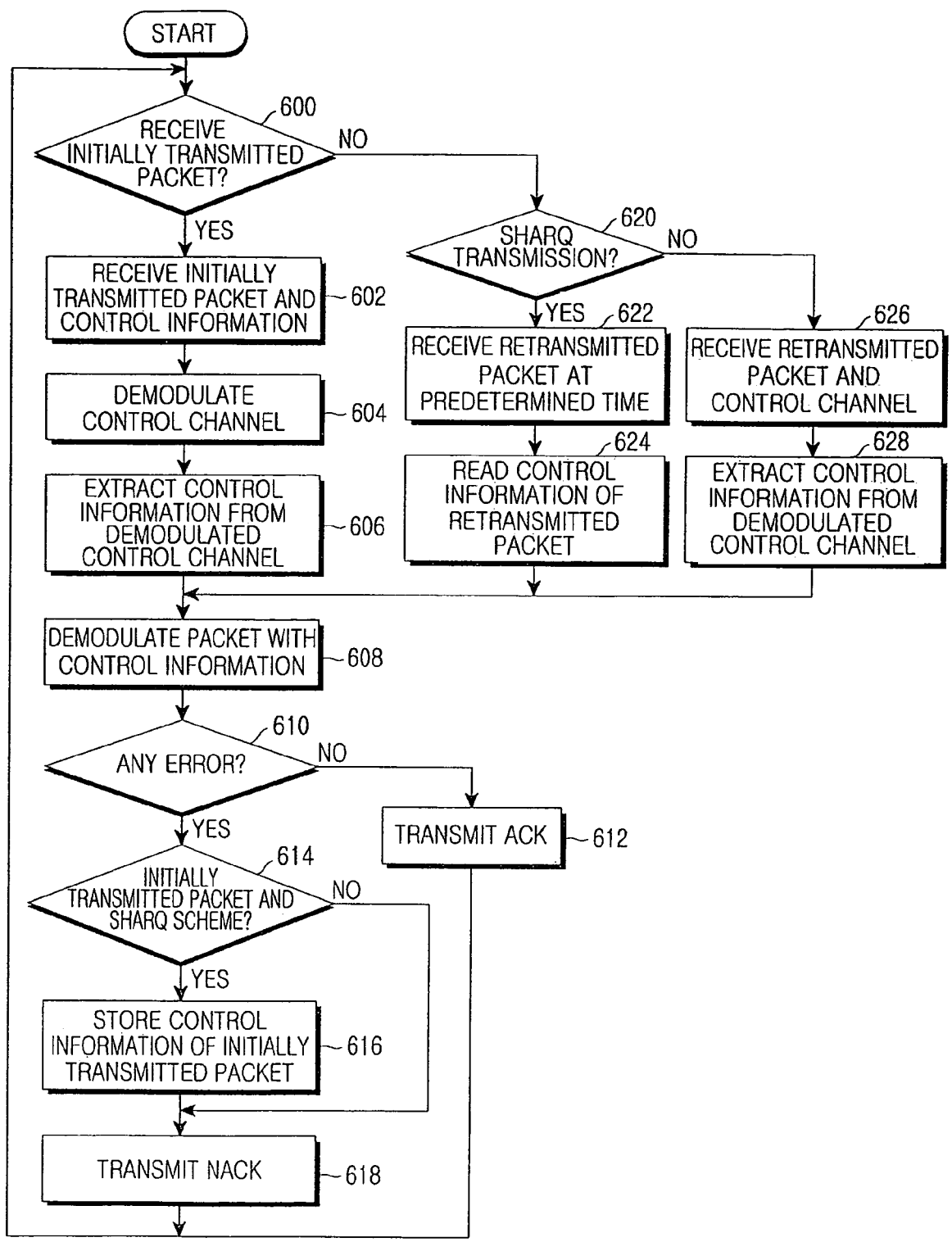
FIG. 6 is a flowchart illustrating a packet reception operation in a receiver according to an exemplary embodiment of the present invention.

FIG. 6 is a flowchart illustrating a packet reception operation in a receiver according to an exemplary embodiment of the present invention. With reference to FIG. 6, a detailed description will now be made of a packet reception operation in a receiver according to an exemplary embodiment of the present invention.

The controller 411 of the receiver determines in step 600 whether to receive the initially transmitted packet. That is, the controller 411 determines whether it will receive the initially transmitted packet or the retransmitted packet. For this operation, the controller 411 determines whether it transmitted an ACK or a NACK through a response channel for the previously received packet, or whether the current reception has reached the maximum number of retransmissions or is the initial reception. If it is determined that the receiver is to receive the initially transmitted packet, the controller 411 receives the initially transmitted packet using the data channel receiver/demodulator 403, and receives a control channel using the control channel receiver/demodulator 401 in step 602. This is because both the SHARQ scheme and the AHARQ scheme receive the control channel at the initial transmission. Upon receipt of the control channel, the controller 411 demodulates the control channel by controlling the control channel receiver/demodulator 401 in step 604. The controller 411 demodulates the data received from the control channel and acquires the control information as shown in Table 2 in step 606.

After demodulating the control information, the controller 411 demodulates and decodes the packet data received by the data channel receiver/demodulator 403 using the control information in step 608. The data channel receiver/demodulator 403 then provides the demodulation and decoding result back to the controller 411. The demodulation and decoding result can be a CRC result value.

The controller 411 determines in step 610 whether there is any error in the received packet, using the CRC result value. If it is determined that there is no error in the received packet, the controller proceeds to step 612 where it controls the response channel transmitter 405 so as to transmit an ACK through a response channel. However, if it is determined from the CRC result value that there is an error in the received packet, the controller 411 determines in step 614 whether the received packet is the initially transmitted packet and was transmitted with the SHARQ scheme. If the received packet is the initially transmitted packet and was transmitted with the SHARQ scheme, the control information for the initially transmitted packet preferably should be stored, because the control information will not be transmitted at the next transmission.

Therefore, if the received packet is the initially transmitted packet and was transmitted with the SHARQ scheme, the controller 411 stores the control information in the memory 407 in step 616. An exemplary reason for storing the control information in the foregoing condition is because in the SHARQ scheme, the control information is not transmitted at the next transmission. In this case, therefore, the control information should be stored in the memory 407. However, in the AHARQ scheme, because the control information is continuously transmitted at the next transmission, there is no need to store the control information in the memory 407. Further, in the modified SHARQ scheme, newly received information should be used as the partial information in the information stored in the memory 407.

However, if the received packet is not the initially transmitted packet or was transmitted with the AHARQ scheme, the controller 411 proceeds to step 618 where it controls the response channel transmitter 405 so as to transmit a NACK through the response channel.

If it is determined in step 600 that the received packet is not the initially transmitted packet, the controller 411 determines in step 620 whether the current transmission scheme is the SHARQ scheme. If it is determined that the current transmission scheme is the SHARQ scheme, the controller 411 receives the retransmitted packet at a predetermined time in step 622. The SHARQ scheme can receive the retransmitted packet at a predetermined time because a time interval between the initial transmission time and the retransmission time, or between the previous retransmission time and the current retransmission time, is predetermined, and only the data channel is transmitted without the control channel. In step 624, the controller 411 reads control information for the retransmitted packet from the memory 407, and then proceeds to step 608. The information read in the data reading process is control information and has predetermined values. For example, information such as Data Information Size, MCS Information, Used Resource Information, and ARQ ID is unchanged and comprises the information regardless of the initial transmission or the retransmission, or information that is estimated. However, only the Sub-Packet ID has a value that is increased by one from the previous one. For example, if the previous Sub-Packet ID was '1', the present Sub-Packet ID is '2', since the Sub-Packet ID is used for identifying each retransmission among several retransmissions of one packet data. However, in the modified SHARQ scheme, the MCS Information and the Used Resource Information can be changed, and the changed information is received together with the packet data in step 622.

However, if it is determined in step 620 that the current transmission is the AHARQ transmission, the controller 411 receives the retransmitted packet and the control channel in step 626. Herein, because the transmission time of the retransmission packet and the control channel is unknown, the controller 411 continuously waits for the control information including an ID of the mobile station or an ID of the receiver. Upon receipt of the control information, the controller 411 determines that the retransmission packet and the control channel are received. Upon receipt of the control channel and the retransmitted packet, the controller 411 extracts control information from the demodulated control channel in step 628. The control information indicates the control information as shown in Table 2. Thereafter, the controller 411 proceeds to step 608 and performs succeeding steps thereby transmitting a response channel.

As can be understood from the foregoing description, embodiments of the present invention adaptively use the SHARQ scheme and the AHARQ scheme in combination in one system using the HARQ scheme, thereby securing higher system capacity with limited wireless resources.

While the invention has been shown and described with reference to certain exemplary embodiments thereof, it will be understood by those skilled in the art that various changes in form and detail may be made therein without departing from the spirit and scope of the invention as defined by the appended claims and equivalents.

What is claimed is:

1. A method for transmitting packet data in a base station of a wireless communication system using a Hybrid Automatic Repeat Request (HARQ) scheme, the method comprising the steps of:
    determining a HARQ scheme from among a plurality of HARQ schemes for transmission packet data, wherein the HARQ scheme determination comprises determining a HARQ scheme based on at least one of a type of service of the transmission packet data, a size of the transmission packet data, a class of a mobile station receiving the packet data, and a load of a current network; and
    transmitting the packet data along with control information including information indicating the determined HARQ scheme.

2. The method of claim 1, wherein the plurality of HARQ schemes comprise a Synchronous HARQ (SHARQ) scheme and an Asynchronous HARQ (AHARQ) scheme.

3. The method of claim 2, where if the determined HARQ scheme is the SHARQ scheme, control information for retransmission packet data is not transmitted during retransmission.

4. The method of claim 2, wherein if the determined HARQ scheme is the SHARQ scheme and packet data transmitted during retransmission is changed from packet data transmitted during initial transmission, the packet data is transmitted along with control information changed for the retransmission packet data.

5. The method of claim 4, wherein the change in the retransmission packet data includes an amount and position of a resource used for a data channel.

6. The method of claim 4, wherein the change in the retransmission packet data includes a Modulation and Coding Scheme (MCS) level used for a data channel.

7. The method of claim 1, wherein the determination of the HARQ scheme comprises determining a HARQ scheme at every initial transmission.

8. A method for transmitting packet data in a mobile station of a wireless communication system using a Hybrid Automatic Repeat Request (HARQ) scheme, the method comprising:
    receiving, from a base station of a wireless communication system, a transmission command of a Synchronous HARQ (SHARQ) scheme or an Asynchronous HARQ (AHARQ) scheme for packet data to be transmitted to the base station;
    determining a HARQ scheme based on at least one of a type of service of the transmission packet data, a size of the transmission packet data, a class of a mobile station receiving the packet data, and a load of a current network; and
    generating packet data and control information with a HARQ scheme based on the command received from the base station, and transmitting the generated packet data and control information.

9. The method of claim 8, wherein if the determined HARQ scheme is the SHARQ scheme and a request for transmission of packet data transmitted during retransmission, changed from the packet data transmitted during initial transmission, is received from the base station, the packet data is transmitted along with control information changed for the retransmission packet data.

10. An apparatus for transmitting packet data in a base station of a wireless communication system using a Hybrid Automatic Repeat Request (HARQ) scheme, the apparatus comprising:
    a scheduler for determining a HARQ scheme from among a plurality of HARQ schemes for transmission packet data, wherein the scheduler is configured to determine the HARQ scheme based on at least one of a type of service of the transmission packet data, a size of the transmission packet data, a class of a mobile station receiving the packet data, and a load of a current network; and
    a controller for transmitting the packet data along with control information including information indicating the HARQ scheme determined by the scheduler.

11. The apparatus of claim 10, wherein the plurality of HARQ schemes comprise a Synchronous HARQ (SHARQ) scheme and an Asynchronous HARQ (AHARQ) scheme.

12. The apparatus of claim 11, wherein if the determined HARQ scheme is the SHARQ scheme, the controller is configured to transmit no control information for a retransmission packet data during retransmission.

13. The apparatus of claim 11, wherein if the determined HARQ scheme is the SHARQ scheme and packet data transmitted during retransmission is changed from the packet data transmitted during initial transmission, the controller is configured to transmit the packet data along with control information changed for the retransmission packet data.

14. The apparatus of claim 13, wherein the change in the retransmission packet data includes an amount and position of a resource used for a data channel.

15. The apparatus of claim 13, wherein the change in the retransmission packet data includes a Modulation and Coding Scheme (MCS) level used for a data channel.

16. The apparatus of claim 13, wherein the scheduler is configured to determine a HARQ scheme at every initial transmission.

17. A method for receiving packet data using a Hybrid Automatic Repeat Request (HARQ) scheme in a receiver of a wireless communication system that transmits packet data using one of a Synchronous HARQ (SHARQ) scheme and an Asynchronous HARQ (AHARQ) scheme, the method comprising:

receiving a control channel and a data channel, and determining a HARQ scheme from among a SHARQ scheme and a AHARQ scheme using information included in the control channel, wherein the HARQ scheme determination comprises determining a HARQ scheme based on at least one of a type of service of transmission packet data, a size of the transmission packet data, a class of a mobile station receiving the packet data, and a load of a current network;

performing demodulation and decoding on the data channel according to the determined HARQ scheme, and transmitting the demodulation and decoding result through a response channel; and when a retransmission packet is received through the data channel, receiving the retransmission data according to the determined HARQ scheme and transmitting the reception result through a response channel.

18. The method of claim 17, wherein when the control channel is received during retransmission, packet data undergoes reception, demodulation and decoding based on information in the received control channel.

19. An apparatus for receiving packet data using a Hybrid Automatic Repeat Request (HARQ) scheme in a receiver of a wireless communication system that transmits packet data using one of a Synchronous HARQ (SHARQ) scheme and an Asynchronous HARQ (AHARQ) scheme, the apparatus comprising:

a control channel receiver for receiving and demodulating a control channel;

a data channel receiver for receiving a data channel, and demodulating and decoding the received data channel;

a response channel transmitter for transmitting the demodulation and decoding result on the data channel;

a memory for receiving and storing control information; and a controller for, determining one HARQ scheme from among the SHARQ scheme and the AHARQ scheme using information included in the control channel, wherein the HARQ scheme determination comprises determining a HARQ scheme based on at least one of a type of service of transmission packet data, a size of the transmission packet data, a class of a mobile station receiving the packet data, and a load of a current network, controlling reception, demodulation and decoding of the data channel receiver according to the determined HARQ scheme, controlling transmission of the demodulation and decoding result to the response channel transmitter, and when a retransmission packet is received with the SHARQ scheme, controlling demodulation and decoding of the received packet using information stored in the memory, and when a retransmission packet is received with the AHARQ scheme, controlling demodulation and decoding of a packet received at the data channel receiver using control information received at the control channel receiver.

20. The apparatus of claim 19, wherein when control information is received at the control channel receiver during retransmission, the controller is configured to store the received control information in the memory, and control the data channel receiver using the received control information so as to perform reception, demodulation and decoding of the packet data.

* * * * *